US012067528B1

(12) United States Patent
Naik et al.

(10) Patent No.: US 12,067,528 B1
(45) Date of Patent: Aug. 20, 2024

(54) APPARATUS AND METHOD FOR MANAGING PERISHABLE FOOD ITEMS

(71) Applicant: Wonder Group, Inc., New York, NY (US)

(72) Inventors: Jay Naik, New York, NY (US); Stephen Toebes, New York, NY (US)

(73) Assignee: WONDER GROUP, INC., New York, NY (US)

( * ) Notice: Subject to any disclaimer, the term of this patent is extended or adjusted under 35 U.S.C. 154(b) by 227 days.

(21) Appl. No.: 17/829,322

(22) Filed: May 31, 2022

Related U.S. Application Data

(60) Provisional application No. 63/194,177, filed on May 28, 2021.

(51) Int. Cl.
| | |
|---|---|
| *B65D 88/74* | (2006.01) |
| *F25D 11/00* | (2006.01) |
| *F25D 17/06* | (2006.01) |
| *G06Q 10/0832* | (2023.01) |
| *G06Q 10/087* | (2023.01) |

(52) U.S. Cl.
CPC ....... *G06Q 10/087* (2013.01); *G06Q 10/0832* (2013.01)

(58) Field of Classification Search
CPC .................. G06Q 10/087; G06Q 10/0832
See application file for complete search history.

(56) References Cited

U.S. PATENT DOCUMENTS

| | | | | | |
|---|---|---|---|---|---|
| 3,215,059 | A | * | 11/1965 | Haas | F24F 9/00 |
| | | | | | 62/237 |
| 4,601,509 | A | * | 7/1986 | Ellis, Sr. | B60P 3/0257 |
| | | | | | 296/22 |
| 5,161,848 | A | * | 11/1992 | Lutton | B60P 3/205 |
| | | | | | 296/181.6 |
| 5,285,604 | A | * | 2/1994 | Carlin | E04H 1/1205 |
| | | | | | 52/36.2 |
| 5,833,295 | A | * | 11/1998 | Farlow, Jr. | B60P 3/14 |
| | | | | | 296/22 |
| 6,431,628 | B1 | * | 8/2002 | Bell, Jr. | B60P 3/0257 |
| | | | | | 296/22 |
| 6,442,957 | B1 | * | 9/2002 | Voogt | B65F 3/00 |
| | | | | | 62/239 |
| 6,470,698 | B2 | * | 10/2002 | Nishi | B60J 9/04 |
| | | | | | 62/239 |

(Continued)

FOREIGN PATENT DOCUMENTS

| | | | | | |
|---|---|---|---|---|---|
| EP | | 1068973 A1 | * | 1/2001 | B60J 9/04 |
| EP | | 1068973 B1 | * | 11/2004 | B60J 9/04 |

*Primary Examiner* — Talia F Crawley
(74) *Attorney, Agent, or Firm* — King & Spalding LLP

(57) ABSTRACT

An apparatus and method for transferring perishable food items between a refrigerated storage unit and a mobile kitchen vehicle maintains the integrity of the perishable food items in connection with a replenishment operation or a restocking operation. The refrigerated storage unit comprises a side door that can be retracted. The side door can comprise a canopy and an air curtain. The canopy and the air curtain assist in maintaining a refrigerated temperature of the perishable food items as they are transferred from the refrigerated storage unit to the receiving truck. The refrigerated storage unit can comprise additional side doors to accommodate multiple receiving food trucks simultaneously.

10 Claims, 8 Drawing Sheets

(56) References Cited

U.S. PATENT DOCUMENTS

| | | | | |
|---|---|---|---|---|
| 6,508,076 B1* | 1/2003 | Gast | | B65D 88/745 |
| | | | | 62/239 |
| 6,606,875 B1* | 8/2003 | Grand | | F25D 11/003 |
| | | | | 62/239 |
| 6,640,569 B2* | 11/2003 | Goosman | | F25D 11/003 |
| | | | | 62/239 |
| 10,525,865 B2* | 1/2020 | Wilkinson | | B60P 3/20 |
| 10,655,908 B2* | 5/2020 | Qi | | F04B 49/065 |
| 10,891,582 B2* | 1/2021 | Klingbeil | | G01S 1/0423 |
| 2007/0245756 A1* | 10/2007 | Gill | | F25D 11/003 |
| | | | | 62/239 |
| 2008/0036238 A1* | 2/2008 | Weeda | | B60P 3/20 |
| | | | | 296/146.1 |
| 2009/0013712 A1* | 1/2009 | Norris | | B60P 3/205 |
| | | | | 62/407 |
| 2011/0120159 A1* | 5/2011 | Jevaney | | B60P 3/205 |
| | | | | 62/131 |
| 2013/0055730 A1* | 3/2013 | Fragnito | | F25D 29/003 |
| | | | | 62/190 |
| 2013/0104578 A1* | 5/2013 | Jessen | | F25D 29/00 |
| | | | | 62/89 |
| 2014/0345304 A1* | 11/2014 | Leung | | F25D 17/06 |
| | | | | 62/380 |
| 2017/0234608 A1* | 8/2017 | Sato | | F25D 17/06 |
| | | | | 454/75 |
| 2019/0034857 A1* | 1/2019 | Ferguson | | G06Q 10/0834 |
| 2020/0167722 A1* | 5/2020 | Goldberg | | G08G 5/003 |
| 2020/0242855 A1* | 7/2020 | Sandu | | G16Y 40/10 |
| 2021/0024215 A1* | 1/2021 | Browne | | G06Q 10/087 |
| 2021/0065103 A1* | 3/2021 | Hauser | | G06Q 50/265 |
| 2022/0318741 A1* | 10/2022 | Wang | | G06K 19/06028 |
| 2022/0335757 A1* | 10/2022 | Norrish | | G07C 9/00182 |
| 2022/0388369 A1* | 12/2022 | Schumacher | | B60H 1/00428 |
| 2023/0004930 A1* | 1/2023 | Schaeffer | | G06Q 50/12 |
| 2023/0158937 A1* | 5/2023 | Vinson | | B60P 3/0257 |
| | | | | 296/22 |

* cited by examiner

APPARATUS AND METHOD FOR MANAGING PERISHABLE FOOD ITEMS

RELATED APPLICATIONS

The present application claims priority to U.S. Provisional Patent Application No. 63/194,177 filed on May 28, 2021, the entire content of which is incorporated herein by reference.

TECHNICAL FIELD

Embodiments of the technology relate generally to preparation and delivery of food items and, more specifically to transferring perishables to trucks in a replenishment operation.

BACKGROUND

The popularity of food take-out and food delivery services continues to grow. The ability to prepare food for a customer during the delivery process can ensure that the customer receives the food in the optimal condition. However, preparing food during the delivery process requires food trucks to be replenished with food so that they can continue serving customers. Accordingly, an efficient system for replenishing food trucks would be beneficial. Furthermore, a system for replenishing food trucks that maintains the freshness and/or cooled temperature of perishable foods also would be beneficial. Additionally, a system for restocking perishable food inventory in storage for future use by food trucks would be advantageous.

SUMMARY

In one example embodiment, the present disclosure is generally directed to a method transferring perishable items in a replenishment operation. The method can comprise: (i) positioning a mobile kitchen vehicle adjacent to a refrigerated storage unit, wherein a mobile kitchen vehicle side door is aligned with a first side door of the refrigerated storage unit; (ii) retracting the first side door of the refrigerated storage unit; (iii) deploying a first canopy of the first side door; (iv) activating a first air curtain of the first side door; (v) opening the mobile kitchen vehicle side door; and (vi) transferring the perishable items through the first side door of the refrigerated storage unit, through the mobile kitchen vehicle side door, and into the mobile kitchen vehicle.

In another example embodiment, the disclosure is generally directed to a system for a replenishment operation. The system can comprise: a refrigerated storage unit, the refrigerated storage unit comprising: a first side door, the first side door comprising a first canopy and a first air curtain; and a second side door, the second side door comprising a second canopy and a second air curtain. A first mobile kitchen vehicle comprising a first mobile kitchen vehicle side door is configured to be positioned adjacent the refrigerated storage unit and aligned with the first side door. The first side door is configured to be retracted, the first canopy is configured to be deployed when the first side door is retracted, and the first air curtain is configured to be activated when the first side door is retracted. The perishable items pass through the first side door, the first mobile kitchen vehicle side door, and into the first mobile kitchen vehicle.

In yet another example embodiment, the disclosure is generally directed to a system for a restocking operation. The system can comprise: a refrigerated storage unit, the refrigerated storage unit comprising: a first side door, the first side door comprising a first canopy and a first air curtain; and a second side door, the second side door comprising a second canopy and a second air curtain. A first mobile kitchen vehicle comprising a first mobile kitchen vehicle side door is configured to be positioned adjacent the refrigerated storage unit and aligned with the first side door. The first side door is configured to be retracted, the first canopy is configured to be deployed when the first side door is retracted, and the first air curtain is configured to be activated when the first side door is retracted. The perishable items pass through the first mobile kitchen side door, through the first side door, and into the refrigerated storage unit.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of an apparatus and method for transferring perishables in a replenishment operation or a restocking operation and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for transferring perishable food items in connection with a replenishment operation or a restocking operation. The example embodiments described herein can provide an improved approach to maintaining perishable items at a cooled temperature when transferring the perishable items between a refrigerated storage unit and a mobile kitchen vehicle. The example embodiments are particularly useful for mobile kitchen vehicles that are configured for the preparation of food onboard the vehicle, but the embodiments can be applied to other vehicles that transport perishable food items.

Specifically, the example embodiments described herein provide a refrigerated storage unit equipped with side doors that facilitate transfer of perishable food items between the refrigerated storage unit and adjacent mobile kitchen vehicles. The side doors of the refrigerated storage unit can include a canopy that extends outward towards the receiving trucks positioned adjacent to the refrigerated storage unit. The side doors also can include an air curtain that expels ambient warm air and maintains cool air in the refrigerated storage unit and within the canopy. The combination of the canopy and the air curtain can assist in maintaining the perishable food items at a cool temperature as they are transferred between the refrigerated storage unit to the mobile kitchen vehicle.

As used herein, "mobile kitchen vehicle" means any vehicle with the capability to prepare food for delivery, including but not limited to a mobile kitchen, a mobile restaurant, and a food truck. As used herein, "food" should be interpreted broadly to include any liquid, solid, or mixture that is consumed. Additionally, as used herein, the preparation of food onboard a vehicle should be interpreted broadly and includes but is not limited to mixing, combining, cooling, warming, reheating, rethermalizing, steaming, cooking, frying, air frying, toasting, boiling, broiling, baking, steaming, and sous vid techniques.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
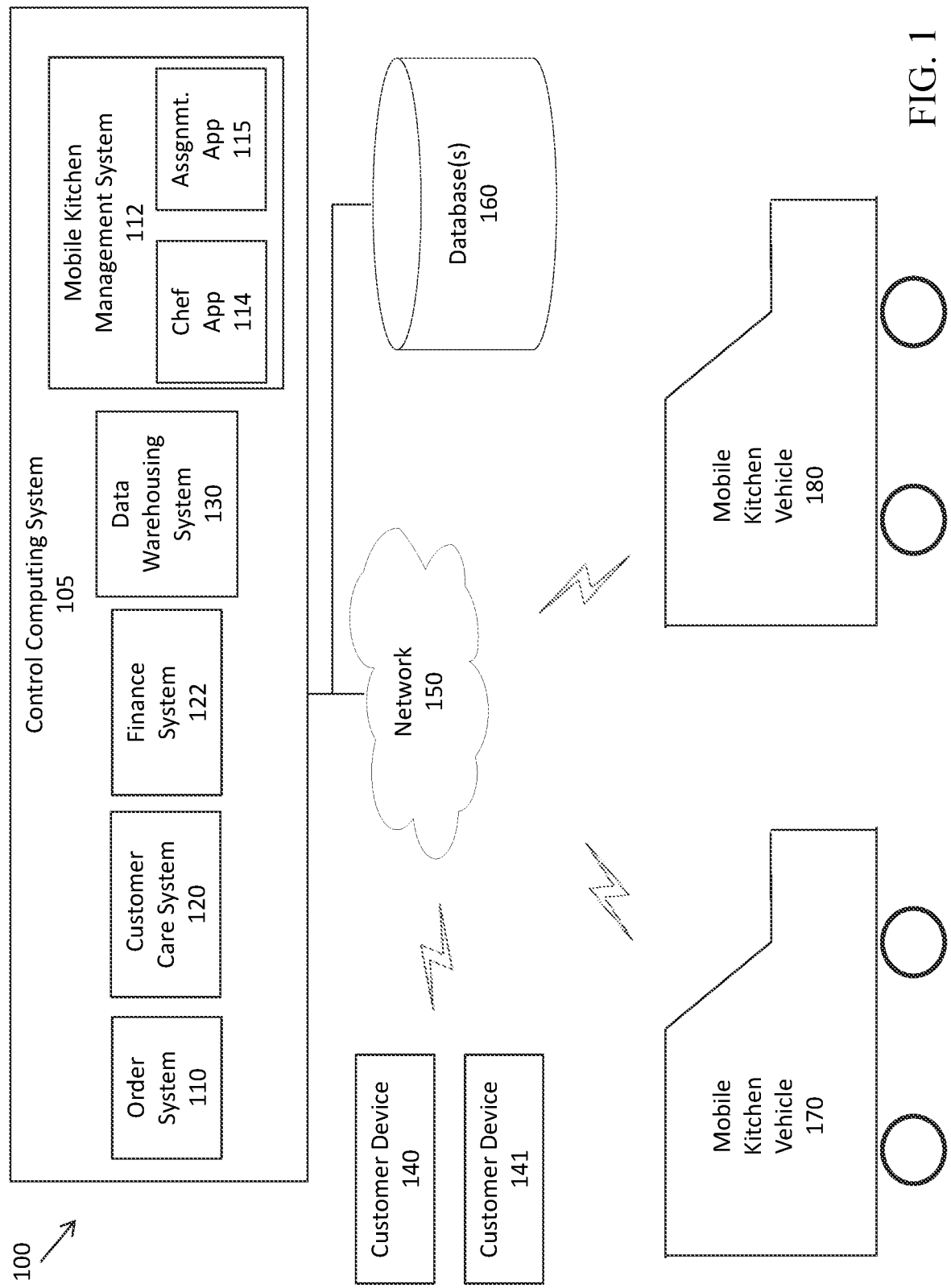
FIG. 1 is a block diagram illustrating a system used in food preparation and delivery in accordance with the example embodiments of the disclosure.
Figure 2:
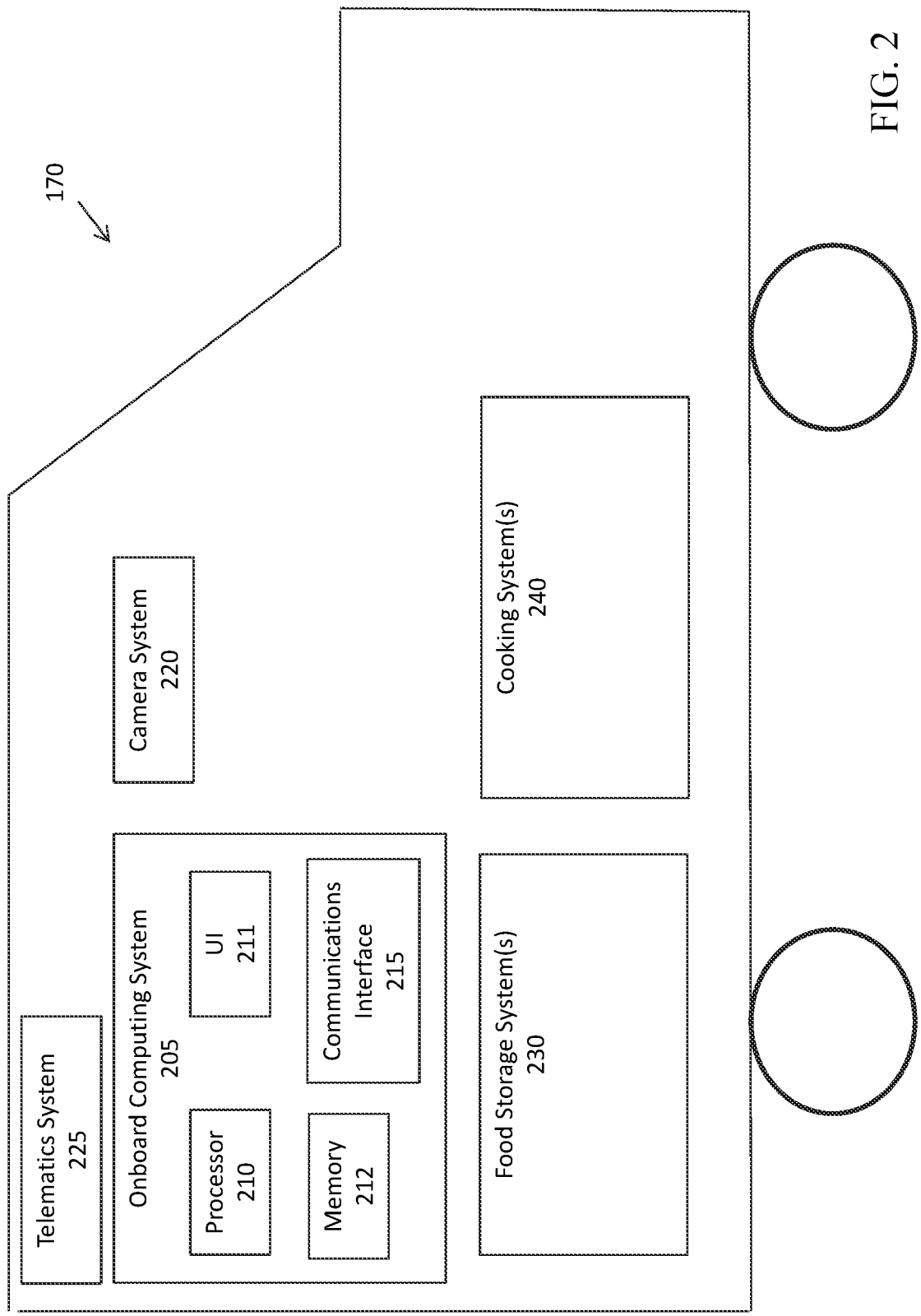
FIG. 2 is another block diagram illustrating a vehicle that is part of the system of FIG. 1 in accordance with the example embodiments of the disclosure.
Figure 3A:
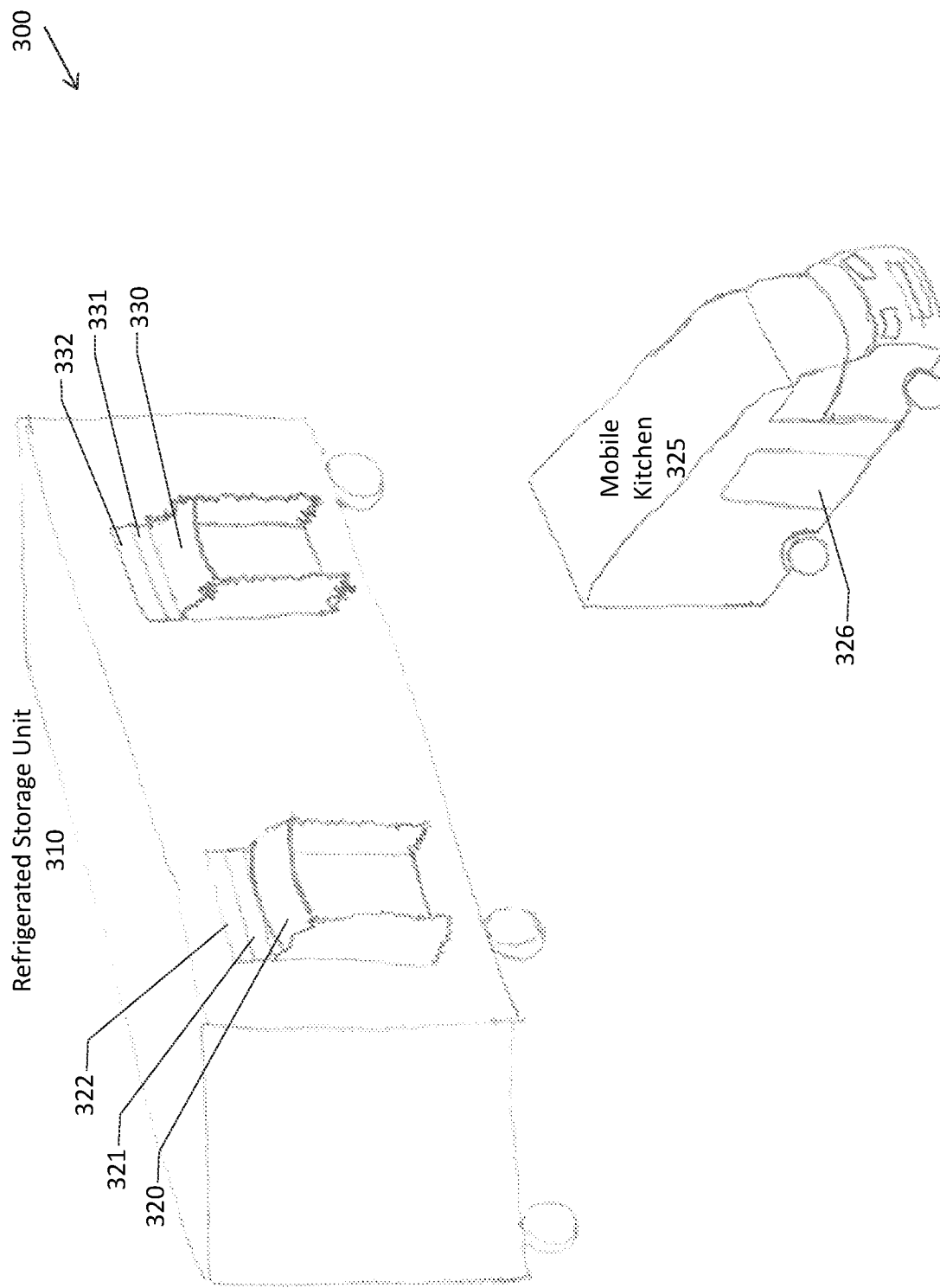
FIG. 3A is an illustration of operations at a replenishment center in accordance with the example embodiments of the disclosure.
Figure 3B:
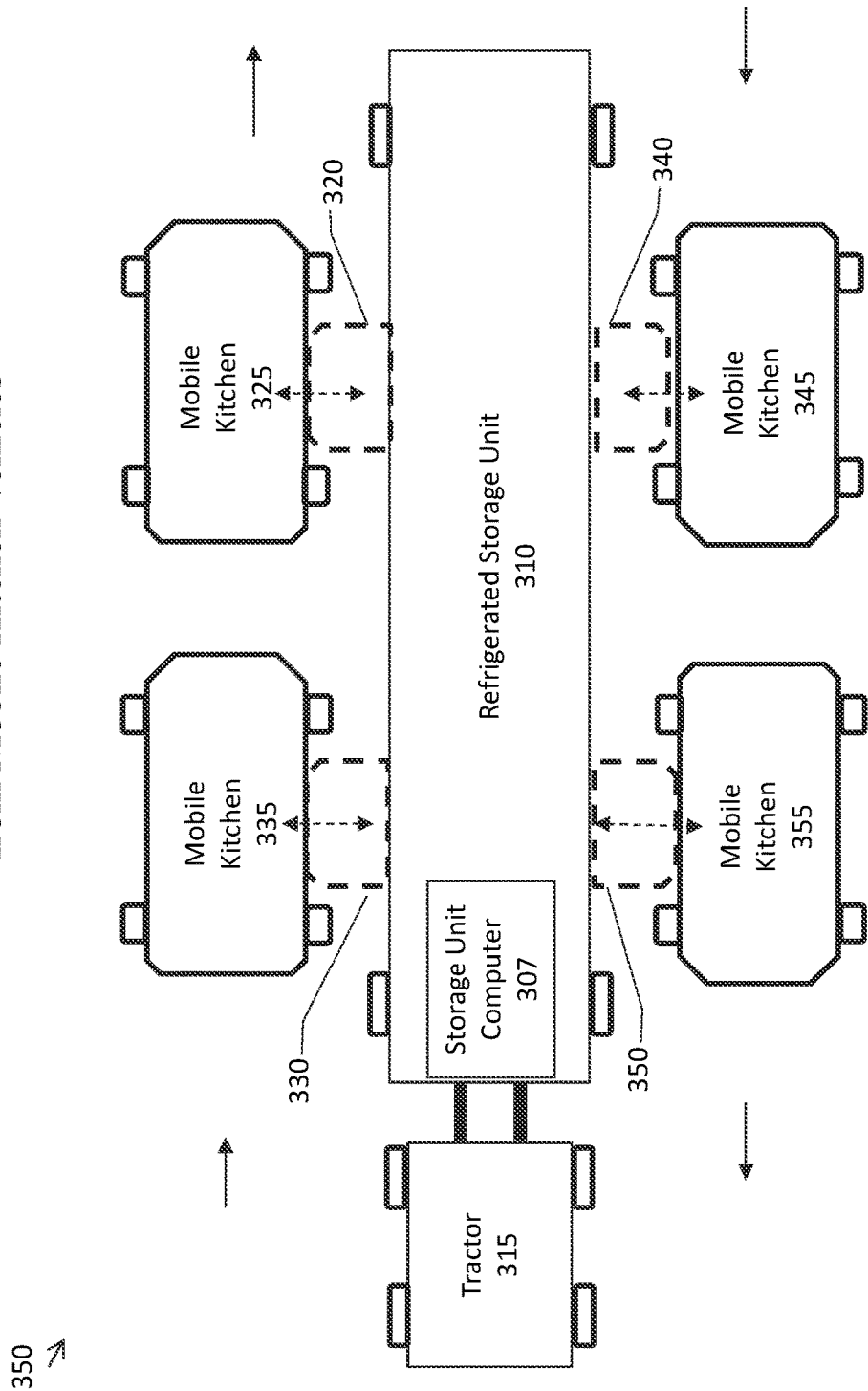
FIG. 3B is another illustration of operations at a replenishment center in accordance with the example embodiments of the disclosure.
Figure 4:
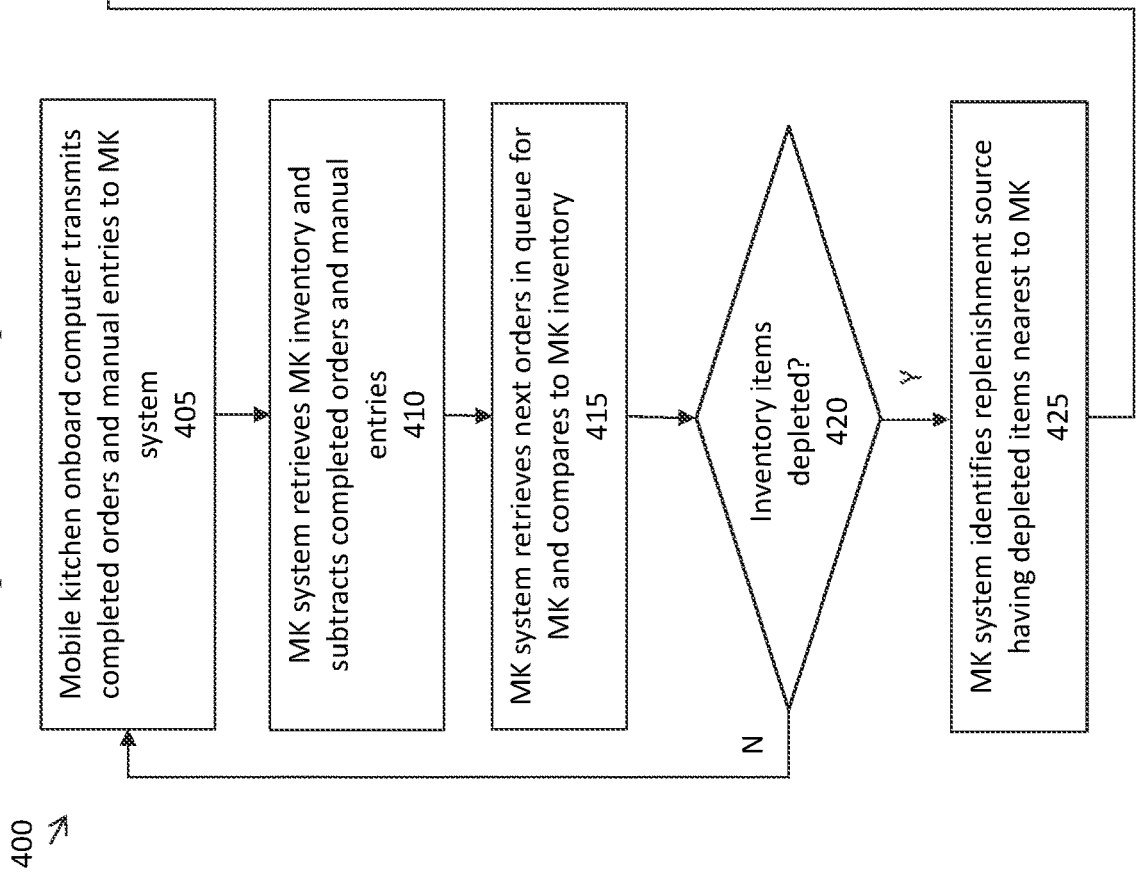
FIG. 4 is a flow chart of an example method for commencing a replenishment operation in accordance with the example embodiments of the disclosure.
Figure 5:
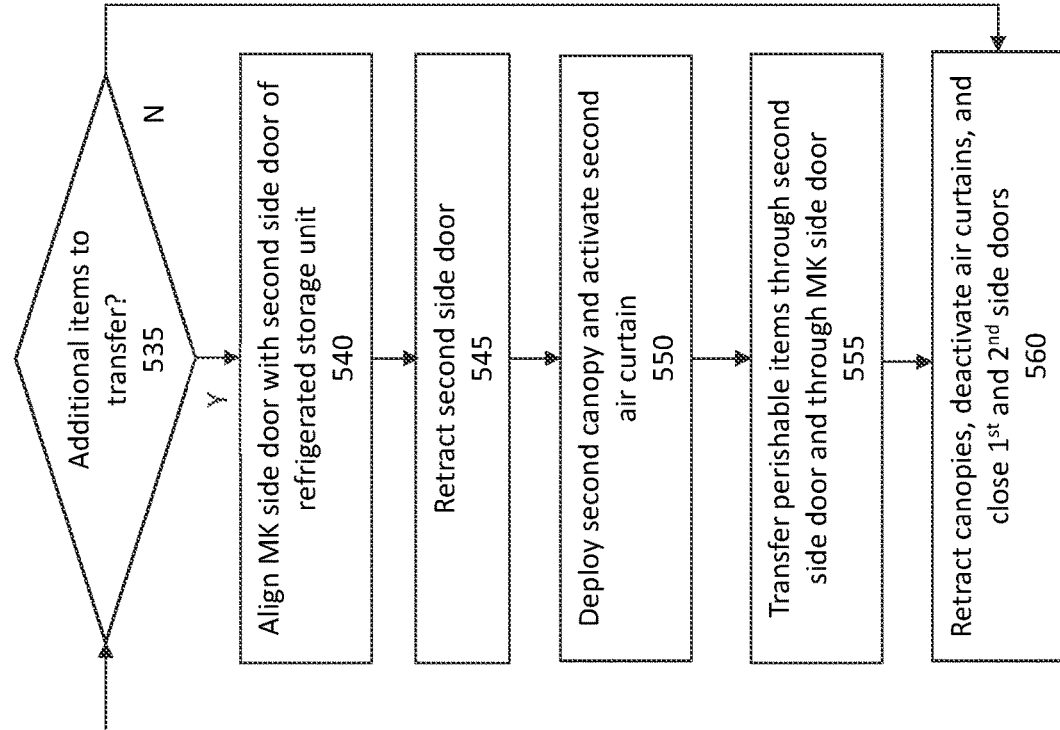
FIG. 5 is a flow chart of an example method for completing a replenishment operation in accordance with the example embodiments of the disclosure.
Figure 5:
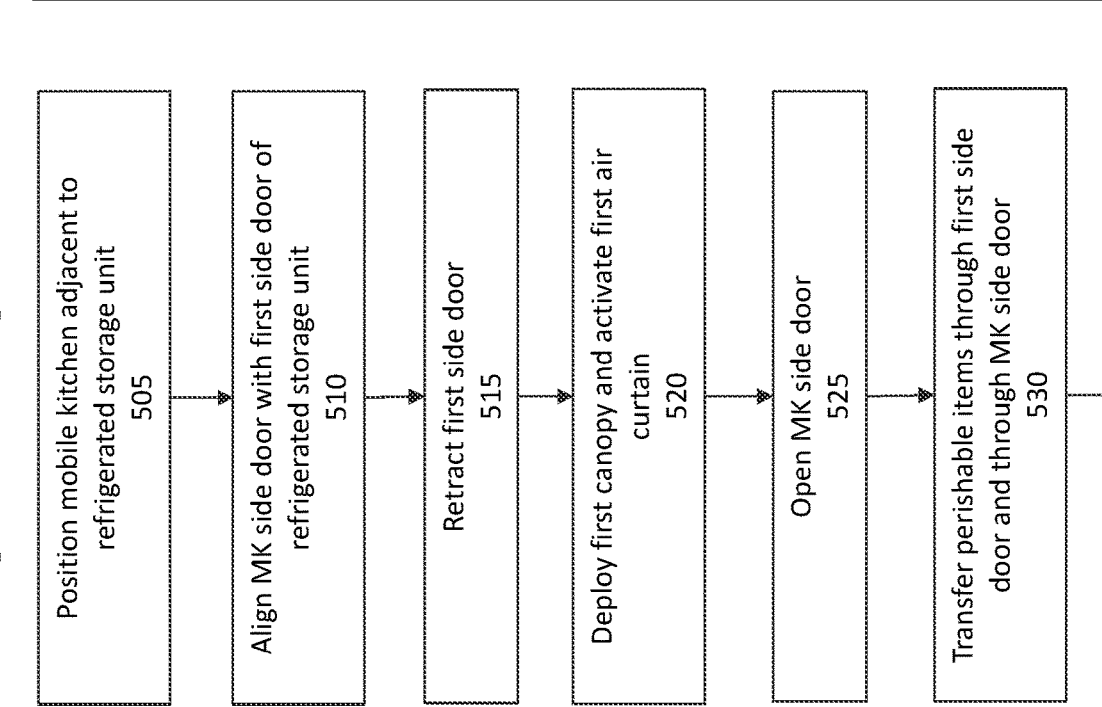
Figure 6:
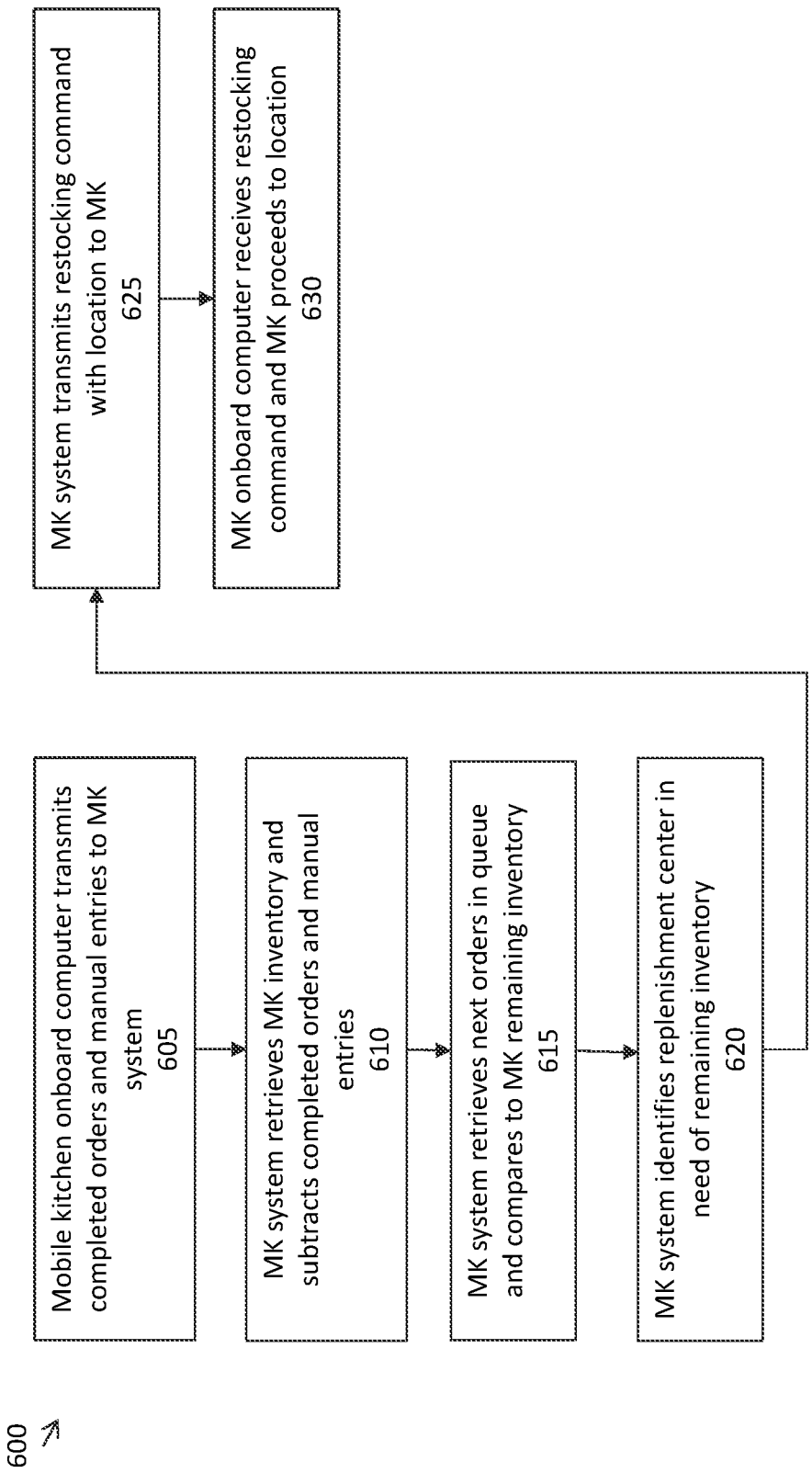
FIG. 6 is a flow chart of an example method for commencing a restocking operation in accordance with the example embodiments of the disclosure.
Figure 7:
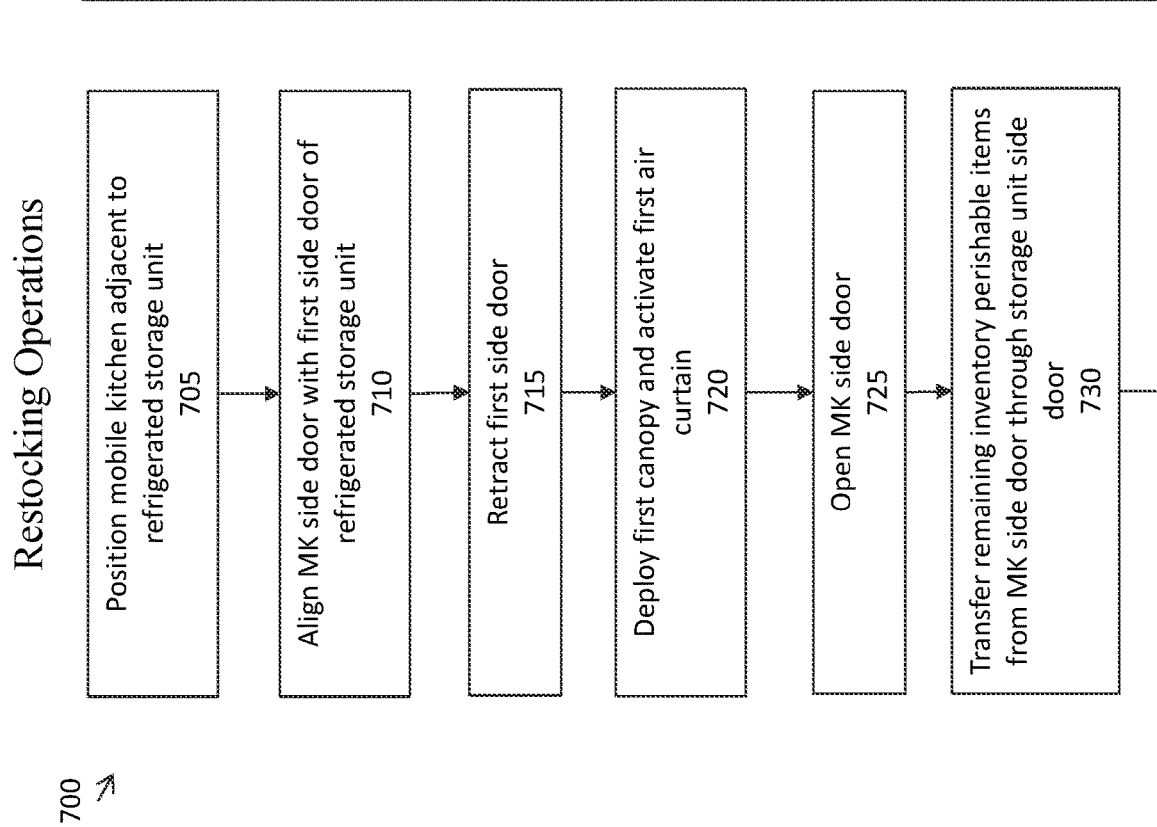
FIG. 7 is a flow chart of an example method for completing a restocking operation in accordance with the example embodiments of the disclosure.

FIGS. 1 and 2 are block diagrams illustrating the architecture and subsystems of an example food preparation and delivery system. FIGS. 3A and 3B illustrate operations for managing perishable food items at a replenishment center. FIGS. 4 and 5 illustrate methods associated with a replenishment operation and FIGS. 6 and 7 illustrate methods associated with a restocking operation.

Control Computing System and Mobile Kitchen Management System

Referring now to FIG. 1, a block diagram is provided illustrating the architecture of an example food preparation and delivery system 100. The system 100 comprises a control computing system 105 and mobile kitchen vehicles 170 and 180. While only two mobile kitchen vehicles 170 and 180 are illustrated in FIG. 1 for simplicity, it should be understood that the system is scalable and is designed to support many more mobile kitchen vehicles. The mobile kitchen vehicles communicate with the control computing system via a network 150 that can include one or more of a cellular mobile network, a wide area network, and the Internet. Additionally, customers can communicate orders for food items via network 150, or an alternate communications network, to the control computing system 105. The customers can communicate orders using a customer device 140 or 141, such as a mobile telephone, a smart phone, or a personal computer. While only two customer devices 140, 141 are illustrated in FIG. 1 for simplicity, it should be understood that the system is designed to support a large number of orders from a multitude of customer devices.

The example control computing system 105 comprises several subsystems illustrated in FIG. 1. The subsystems can be implemented as software, hardware, or a combination of software and hardware. Additionally, the subsystems can be implemented as software applications executing on the control computing system or they can be implemented as software applications or services implemented on separate or remote computing systems in a distributed manner. While the subsystems illustrated in FIG. 1 are shown as discrete subsystems of the control computing system 105, it should also be understood that in some examples the subsystems can be combined with each other or with other subsystems not illustrated in the example of FIG. 1.

The subsystems of control computing system 105 include an order system 110 that receives orders for food items from customer devices. The order system 110 hands off customer orders to the mobile kitchen management system 112, which manages the assignment of orders to and communications with mobile kitchen vehicles 170, 180. As one example, the mobile kitchen management system 112 can include a chef application 114 and an assignment application 115. The assignment application 115 can retrieve data regarding the available mobile kitchen vehicles, their locations, their currently assigned customer orders, and their current inventory. The assignment application 115 can use the retrieved data to make assignments of new customer orders to mobile kitchen vehicles. For example, the assignment application 115 can identify mobile kitchen vehicles that are within a certain distance of a customer and that have the food items identified in the customer's order in inventory onboard the mobile kitchen vehicle. The assignment application 115 can select from among the identified mobile kitchen vehicles a mobile kitchen vehicle best suited to fulfill the customer order. Criteria for selecting a mobile kitchen vehicle can include proximity to the customer and the number of customer orders already assigned to the mobile kitchen vehicle. The assignment application 115 also can use the inventory data to determine when mobile kitchen vehicles need to be replenished with new food and supplies.

The chef application 114 can analyze the customer orders assigned to a particular mobile kitchen vehicle, determine a preparation schedule for the food items in the customer orders, and present preparation instructions to a chef onboard the mobile kitchen vehicle. In addition to the assignment application 115 and the chef application 114, the mobile kitchen management system 112 can include other applications such as an image processing system that receives images from the mobile kitchen vehicles. For example, one or more cameras onboard the mobile kitchen vehicles can capture images associated with the food prepared onboard the mobile kitchen vehicle and those images can be transmitted via network 150 to the image processing system for use in supervising the preparation of the food items.

Additional example subsystems of control computing system 105 include a customer care system 120, a finance system 122, and a data warehousing system 130. The customer care system 120 can communicate with customer devices regarding reviews of food preparation and food delivery services and can address quality or service concerns. The finance system 122 can process transactions with customer devices. Lastly, the data warehousing system 130 can manage the exchange of data with the various subsystems and the storing of data in one or more databases 160.

Mobile Kitchen Vehicle

FIG. 2 illustrates a more detailed view of example mobile kitchen vehicle 170. The mobile kitchen vehicle 170 comprises a vehicle with subsystems including food storage systems 230, cooking systems 240, and an onboard computing system 205. The onboard computing system 205 can include a processor 210, memory 212, a communications interface 215, a user interface 211, and a camera system 220. The memory 212 can store software applications that support one or more persons working onboard the mobile kitchen vehicle 170. For example, the software applications can include a navigation application that assists a worker in driving the mobile kitchen vehicle 170 to customer locations, commissaries, or supply replenishment centers. The software applications also can include an onboard instance of the chef application that communicates with the chef application 114 of the mobile kitchen management system 112 executing at the control computing system 105. The onboard chef application can receive customer orders for food items from the chef application 114, analyze the customer orders, and provide a chef working onboard the mobile kitchen vehicle 170 with instructions for preparing food items. The onboard computing system 205 can receive customer orders for food items from the mobile kitchen management system 112 via a communications network. The customer orders for food items can be for one or more customers and each order can include instructions for preparing the food items using the cooking systems 240, which can include one or more of an oven, a rethermalizer, a fryer, and a steamer. The onboard computing system 205 can display the instructions for preparing the food items to the chef onboard the vehicle. The food storage systems 230 can contain the ingredients and previously prepared food items that are used in fulfilling the customer orders.

Other systems onboard the mobile kitchen vehicle 170 can include a telematics system 225 and a camera system 220. The telematics system 225 can be used for communications between the onboard computing system 205 and the control computing system 105. The communications can include customer orders, status information regarding the preparation of customer orders onboard the mobile kitchen vehicle, and data associated with the various systems onboard the mobile kitchen vehicle 170 including the cooking systems, the food storage systems, the camera systems, and the engine control system of the mobile kitchen vehicle 170. The camera system 220 can comprise one or more cameras located within the vehicle that can be used to track the progress and the quality of the food preparation. The cameras can supply images of a food item to the onboard computing system 205 and the images can be associated with the food item that is currently being prepared. When the preparation of a food item is completed, the chef can provide an input to the onboard computing system 205 indicating that the food item is completed. The camera system 220 can capture one or more images of the completed food item in its packaging.

The packaging can include a code, such as a bar code or a quick response code, that is visible on the packaging and that is captured in the images taken by the camera system 205. Once the camera system captures an image of the completed food item with the code, the onboard computing system 205 can transmit a completion notification with an associated image to the mobile kitchen management system 112 of the control computing system 105. The image processing system can identify the code in the image and read a tracking identifier embedded in the code. Alternatively, the image processing system can use the code to obtain a tracking identifier in a look-up table. Once the tracking identifier is isolated, the mobile kitchen management system 112 can link the tracking identifier to a menu item identifier for the food item that was completed and the data can be sent to the data warehousing system 130 for storage in database 160.

The functions of the control computing system 105 and the onboard computing system 205 can be implemented with software and hardware. Both the control computing system 105 and the onboard computing system 205 can comprise one or more hardware processors, non-transitory computer-readable memory (which can include volatile and persistent memory), and a communication interface. The non-transitory computer-readable memory can store software, algorithms, instructions and data that can be executed by the one or more processors. For example, instructions for processing an image of a food item to identify a tracking code can be stored in memory for execution by the processor. The instructions executed by the processor can also include commands sent via the communication interface from the control computing system 105 to the onboard computing system 205. Examples of the instructions executed by the processor(s) of the control computing system 105 and the onboard computing system 205 are described in further detail in connection with the example methods of FIG. 4 and FIG. 6.

The processor(s) of the control computing system 105 and onboard computing system 205 can be implemented in a variety forms that are generally known, including but not limited to a central processing unit, a multi-core processor, a system on a chip, a field programmable gate array, and an application-specific integrated circuit. The memory can include both volatile and persistent memory and can store computer-readable instructions for execution by the processor(s) as well as data such as images of food items and customer reviews. In certain example embodiments, in addition to or as an alternative to local memory, computer-readable instructions and data can be stored remotely in database 160 or on a cloud-based server. The communications interface of the control computing system 105 and the onboard computing system 205 can support long range wireless communication, for example via a cellular network.

Replenishment Operations

Referring now to FIGS. 3A, 3B, 4 and 5 example systems and methods are illustrated for the transfer of perishable items in connection with a replenishment operation. The example method illustrated in FIG. 4 can include algorithms stored as computer-readable instructions in memory for execution by the various systems of the control computing system 105 and the onboard computing system 205.

Referring to FIG. 3A, an example replenishment center 300 is illustrated in accordance with the example embodiments of the present disclosure. The replenishment center 300 can include one or more refrigerated storage units, such as unit 310, containing perishable food items. The refrigerated storage units can be stand alone units, stationary units, or mobile units such as trailers that are attached to a tractor. The refrigerated storage units can maintain a cooled temperature for the perishable food items contained therein. As mobile kitchen vehicles deplete their supplies in connection with preparing customer orders, the mobile kitchen vehicles can proceed to the replenishment center to receive additional supplies. In addition to the refrigerated storage units, other types of storage and/or dispensing systems for other types of supplies may also be located at the replenishment center.

As illustrated in the example of FIG. 3A, the refrigerated storage unit 310 can comprise one or more side doors for transferring perishable items to mobile kitchen vehicles. In the example of FIG. 3A, the refrigerated storage unit 310 comprises a first side door 322 and a second side door 332. In alternate embodiments, refrigerated storage units can include more than two side doors and/or can include additional side doors on the opposite side of the refrigerated storage unit 310 that is not visible in FIG. 3A. The example side door 322 can comprise a canopy 320 and an air curtain 321. Likewise, example side door 332 can comprises a canopy 330 and an air curtain 331. The canopy and air curtain can be integral components of the side door that are mounted within the frame of the side door. Alternatively, one or both of the canopy and air curtain can be discrete components located adjacent to the side door.

In one example, the side door can be opened by sliding the door upward into an interior portion of the refrigerated storage unit 310. In alternate examples, the side door can open outward, can roll upward, or can open in another manner. When the side door is opened, the canopy can expand outward from of the side door. The canopy can be made of a flexible material, such as plastic or fabric, the can easily be expanded and retracted. When expanded outward as shown in FIG. 3A, the canopy can define a partially enclosed cavity at which a mobile kitchen vehicle (or receiving truck) can be positioned.

Additionally, when the side door is opened, the air curtain can be activated. The air curtain comprises one or more air moving devices that provides a stream of air at the side doors. The stream of air can be directed downward or outward at the opening of the side door. The stream of air assists in maintaining cooled air within the refrigerated storage unit 310 and the canopies 320, 330, and in excluding warm air. The air curtain can be activated when the side door is opened and either before or after the canopy is expanded.

In the example of FIG. 3A, the mobile kitchen vehicle 325 can drive up next to the refrigerated storage unit 310 so that the mobile kitchen vehicle side door 326 is aligned with one of side door 322 or side door 332. Once the mobile kitchen vehicle side door 326 is aligned with a side door 322, 332 of the refrigerated storage unit 310, the mobile kitchen vehicle side door 326 can be opened to receive perishable food items from the refrigerated storage unit 310. In one example, the mobile kitchen vehicle 325 first can stop at side door 332 to receive a first set of perishable food items and, next, can stop at side door 322 to receive a second set of perishable food items. In yet other embodiments, the mobile kitchen vehicle can also drive to the opposite side of the refrigerated storage unit 310 to receive perishable food items from other side doors that are not visible in FIG. 3A. Once the perishable food items have been transferred from the refrigerated storage unit 310, the one or more side doors of the refrigerated storage unit 310 can be closed to maintain cooled air within the unit. The operation of closing the side doors can also include deactivating the air curtains and retracting the canopies of the respective side doors.

Referring now to FIG. 3B, a top view of another example replenishment center 350 is illustrated. Replenishment center 350 is similar to replenishment center 300 of FIG. 3A. Replenishment center 350 includes one or more refrigerated storage units, such as unit 310. In the example illustrated in FIG. 3B, the refrigerated storage unit 310 has four side doors (not visible in FIG. 3B) with two on one side and two on the opposite side of the unit. As further illustrated in FIG. 3B, canopies 320, 330, 340, and 350 are expanded from the respective side doors of the refrigerated storage unit 310. Additionally, each side door has a respective mobile kitchen vehicle 325, 335, 345, and 355 aligned with the side door. As indicated by the broken line arrows in FIG. 3B, perishable food items are transferred through each side door of the refrigerated storage unit 310 to a respective mobile kitchen vehicle that is aligned by the side door. After the perishable items are transferred, the mobile kitchen vehicle can close its side door and drive to the next side door of the refrigerated storage unit 310 or the mobile kitchen vehicle can depart the replenishment center 350. Additionally, after the perishable food items are transferred to the mobile kitchen vehicles, the canopies 320, 330, 340, and 350 can be retracted, the air curtain at each door can be deactivated, the doors can be closed to maintain the cool air within the refrigerated storage unit 310.

In some example embodiments, the refrigerated storage unit can include a storage unit computer, such as storage unit computer 307 illustrated in the example of FIG. 3B. The storage unit computer 307 can communicate with the control computing system 105 as well as the onboard computers 205 located within each mobile kitchen vehicle. The storage unit computer 307 can maintain a list of inventory stored with the refrigerated storage unit 310 and can coordinate which inventory items are loaded through which side doors and onto which mobile kitchen vehicles. In this way, the storage unit computer 307 can maximize efficiency by directing a mobile kitchen vehicle to a side door closest to the needed inventory items. The storage unit computer 307 also can ensure that the correct inventory items are loaded onto the correct mobile kitchen vehicle.

The example of FIG. 3B shows bidirectional arrows between the mobile kitchen vehicles and the refrigerated storage unit indicating that perishable items can be transferred in either direction. FIGS. 4 and 5 describe methods associated with transferring perishable items from a refrigerated storage unit to mobile kitchen vehicles in connection with operations for replenishing the inventory of the mobile kitchen vehicles. In contrast, FIGS. 6 and 7 describe methods associated with transferring perishable items from mobile kitchen vehicles to a refrigerated storage unit in connection with operations for restocking perishable items.

Referring now to FIG. 4, an example method 400 for commencing a replenishment operation is illustrated. Example method 400 can begin with operation 405 wherein upon completion and delivery of one or more orders to one or more customers, the mobile kitchen's onboard computing system can transmit the completed order(s) to the mobile kitchen management system 112 of the central computing system 105. In addition to completed orders, the chef application operating on the onboard computing system can receive manual entries from the chef, such as entries for dropped or wasted food items, for more accurate tracking of the depletion of the onboard inventory. The onboard computing system can include these manual entries with the completed orders transmitted to the central computing system.

In operation 410, the assignment application 115 the mobile kitchen management system 112 can retrieve from the database 160 the current inventory record for the particular mobile kitchen vehicle and can subtract the items that have been depleted from the mobile kitchen vehicle based upon the completed order information and the manual entry information that was received from the mobile kitchen vehicle. In operation 415, the assignment application 115 of the mobile kitchen management system 112 can analyze the next orders to be handled by the mobile kitchen vehicle to determine whether any of the inventory onboard the mobile kitchen that is required for the next orders has been depleted or is low. The analysis performed by the assignment application 115 can include looking at top level food items, such as a pizza or a steak, as well as the component ingredients needed to prepare a food item, such as spices or toppings. In operation 420, if any inventory items (top level food items or component ingredients) needed for the mobile kitchen vehicle's upcoming orders are depleted, the mobile kitchen management system 112 can identify a replenishment center to provide the depleted items in operation 425. Alternatively, if there is no need to replenish inventory items aboard the mobile kitchen, the method 400 can return to operation 405.

Continuing with operation 430, the mobile kitchen management system 112 transmits the replenishment command with the location of the replenishment center to the mobile kitchen vehicle. Generating the replenishment command can include generating a replenishment list of the food items that the mobile kitchen vehicle should receive at the replenishment center. The assignment application 115 can transmit the replenishment list to the mobile kitchen vehicle along with the replenishment command. Additionally, the assignment application 115 can transmit the replenishment list along with the identification of the mobile kitchen vehicle (such as a vehicle number) to the storage unit computer 307 located at the replenishment center 350. The replenishment list can be used by workers onboard the refrigerated storage unit to ensure the correct items on the replenishment list are transferred to the correct mobile kitchen vehicle with the matching vehicle number. In some example embodiments, the storage unit computer 307 can respond by providing the mobile kitchen vehicle or the mobile kitchen management system with an identifier of the particular refrigerated storage unit at the replenishment center and the particular side door(s) of the unit at which the food items can be received. Lastly, in operation 435, the mobile kitchen onboard computing system receives the replenishment command and the mobile kitchen proceeds to the replenishment center.

Referring to FIG. 5, the method of FIG. 4 continues with the completion of the replenishment operations. In FIG. 5, an example method 500 is illustrated for transferring perishable items to a mobile kitchen vehicle at a replenishment center. In operation 505, the mobile kitchen vehicle drives up adjacent to a refrigerated storage unit, such as the refrigerated storage unit identified with the previously received replenishment command. In operation 510, the mobile kitchen aligns its side door with a first side door of the refrigerated storage unit. In operation 515, the first side door of the refrigerated storage unit is opened or retracted. In operation 520, the first canopy at the first side door can be extended and the first air curtain at the first side door can be activated. As such, the first air curtain and the first canopy assist in creating a cool zone for transferring perishable items from the refrigerated storage unit to the mobile kitchen vehicle. In operation 525, the side door of the mobile kitchen vehicle is opened to receive the perishable food items from the refrigerated storage unit as described in operation 530.

In operation 535, if there are additional perishable food items needed onboard the mobile kitchen truck, the mobile kitchen truck can pull up to a second side door of the refrigerated storage unit. For example, the replenishment command and replenishment list received at the mobile kitchen vehicle's onboard computer can identify multiple side doors of one or more refrigerated storage units for receiving the needed food items. In operation 540, the mobile kitchen vehicle side door is aligned with the second side door of the refrigerated storage unit. In operation 545, the second side door of the refrigerated storage unit is opened or retracted. In operation 550, the second canopy at the second side door can be extended and the second air curtain at the second side door can be activated. As such, the second air curtain and the second canopy assist in creating a cool zone for transferring perishable items from the refrigerated storage unit to the mobile kitchen vehicle. In operation 555, the side door of the mobile kitchen vehicle is opened and the perishable items are transferred from the refrigerated storage unit. Lastly, in operation 560, the canopies of the first and second side doors can be retracted, the air curtains can be deactivated, and the first and second side doors of the refrigerated storage unit are closed. The storage unit 307 can transmit a replenishment confirmation to the mobile kitchen vehicle and/or the mobile kitchen management system that the items on the replenishment list have been transferred to the mobile kitchen vehicle. This confirmation allows the assignment application 115 to keep a current record of the inventory onboard the mobile kitchen for purposes of assigning future orders.

Restocking Operations

Referring now to FIGS. 3A, 3B, 6 and 7, example systems and methods are illustrated for the transfer of perishable items in connection with a restocking operation. As used herein "restocking" refers to the transfer of perishable items from a mobile kitchen vehicle to a refrigerated storage unit for storage and later use. For example, at the end of a worker's shift, remaining perishable items can be restocked in the refrigerated storage unit for subsequent loading onto and use by another mobile kitchen vehicle. As described previously, the replenishment centers 300 and 350 of FIGS. 3A and 3B can include one or more refrigerated storage units, such as unit 310, for storing perishable food items. In addition to serving as a location for replenishing mobile kitchen vehicles as described in connection with FIGS. 4 and 5, the replenishment centers can support restocking operations in which remaining perishable items are transferred from a mobile kitchen vehicle to a refrigerated storage unit for later use.

Referring now to FIG. 6, an example method 600 for a restocking assignment operation is illustrated. The example method illustrated in FIG. 6 can include algorithms stored as computer-readable instructions in memory for execution by the various systems of the control computing system 105 and the onboard computing system 205. Example method 600 can begin with operation 605 wherein upon completion of a shift, the mobile kitchen's onboard computing system can transmit the completed orders to the mobile kitchen management system 112 of the central computing system 105. In addition to the completed orders, the onboard computing system can also receive manual entries from the chef regarding depleted inventory, such as food items that were dropped or wasted, and such manual entries also can be transmitted to the mobile kitchen management system 112 of the central computing system 105. In operation 610, the assignment application 115 of the mobile kitchen management system 112 can retrieve the current inventory record from the database 160 for the particular mobile kitchen vehicle and can subtract the items used in the completed orders as well as any manual entries. After subtracting the items in the completed orders and the items in any manual entries, the mobile kitchen management system will have the remaining inventory items onboard the mobile kitchen vehicle as of the time the shift is completed.

In operation 615, the assignment application 115 of the mobile kitchen management system 112 can analyze the next orders to be handled by other mobile kitchen vehicles to determine whether any of the remaining inventory items identified in operation 610 can be used to satisfy the next orders. In operation 620, the assignment application 115 of the mobile kitchen management system 112 can identify a replenishment center at which the remaining inventory items can be best used to satisfy the next orders. Identifying the optimal replenishment center can include consideration of the age (i.e., freshness) of the remaining inventory items, the proximity of mobile kitchen vehicles to the replenishment center, and the timing for when the next orders are due to be delivered. Continuing with operation 625, the assignment application 115 of the mobile kitchen management system 112 transmits a restocking command with the location of the identified replenishment center to the mobile kitchen vehicle that is completing its shift. The restocking command also can identify a particular storage unit and a particular side door or doors of the storage unit to which the remaining inventory should be delivered. The assignment application 115 also can transmit a list of the remaining inventory with an identifier for the mobile kitchen vehicle to a storage unit computer 307 in preparation for receiving the remaining inventory. Lastly, in operation 630, the mobile kitchen onboard computing system receives the restocking command and the mobile kitchen vehicle proceeds to the replenishment center where the remaining inventory items can be transferred to a refrigerated storage unit for later use onboard other mobile kitchen vehicles that have a need for the remaining inventory items.

Referring to FIG. 7, an example method 700 is illustrated for completion of the restocking operations that began in FIG. 6. Method 700 describes the restocking of perishable items from a mobile kitchen vehicle to a refrigerated storage unit at a replenishment center. The operations of method 700 are similar to those of method 500, but describe perishable items flowing in the opposite direction from a mobile kitchen vehicle to a refrigerated storage unit. In operation 705, the mobile kitchen vehicle drives up adjacent to a refrigerated storage unit, such as the unit identified in the restocking command received during method 600. In operation 710, the mobile kitchen vehicle aligns its side door with a first side door of the refrigerated storage unit, such as the side door identified in the previously received restocking command. In operation 715, the first side door of the refrigerated storage unit is opened or retracted. In operation 720, the first canopy at the first side door can be extended and the first air curtain at the first side door can be activated. As such, the first air curtain and the first canopy assist in creating a cool zone for transferring perishable items from the mobile kitchen vehicle to the refrigerated storage unit. In operation 725, the side door of the mobile kitchen vehicle is opened to transfer the perishable items of the remaining inventory from the mobile kitchen vehicle to the refrigerated storage unit as described in operation 730.

In operation 735, if there are additional perishable food items in the remaining inventory to be placed in refrigerated storage, the mobile kitchen vehicle can pull up to a second side door of the refrigerated storage unit. Such second side door can be identified in the restocking command that was transmitted to the mobile kitchen vehicle. In operation 740, the mobile kitchen vehicle side door is aligned with the second side door of the refrigerated storage unit. In operation 745, the second side door of the refrigerated storage unit is opened or retracted. In operation 750, the second canopy at the second side door can be extended and the second air curtain at the second side door can be activated. As such, the second air curtain and the second canopy assist in creating a cool zone for transferring perishable items from the refrigerated storage unit to the mobile kitchen vehicle. In operation 755, the side door of the mobile kitchen vehicle is opened and other perishable items of the remaining inventory are transferred from the mobile kitchen vehicle to the refrigerated storage unit. Lastly, in operation 760, the canopies of the first and second side doors can be retracted, the air curtains can be deactivated, and the first and second side doors of the refrigerated storage unit are closed. Upon completing the restocking operation, the storage unit computer 307 can send a restocking confirmation to the mobile kitchen vehicle's onboard computer and/or to the assignment application 115 of the mobile kitchen management system 112. The assignment application 115 can use the restocking confirmation to maintain a current inventory of the items in the refrigerated storage unit. Maintaining a current inventory of items in the refrigerated storage unit is useful because it allows the assignment application to generate new replenishment commands for other mobile kitchen vehicles that require new inventory.

With respect to the example methods described herein, it should be understood that in alternate embodiments, certain steps of the methods may be performed in a different order, may be performed in parallel, may be combined, or may be omitted. Moreover, in alternate embodiments additional steps may be added to the example methods described herein. Accordingly, the example methods provided herein should be viewed as illustrative and not limiting of the disclosure.

Similarly, for any apparatus shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Terms such as "first", "second", "remote", "distal", "proximal", and "within" are used merely to distinguish one element (or part of an element or state of an element) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the embodiments may be practiced without these specific details. In other instances, well-known features have not been described in detail to avoid unnecessarily complicating the description.

Although example embodiments are described herein, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for transferring perishable items, the system comprising:
   a refrigerated storage unit, the refrigerated storage unit comprising:
      a first side door, the first side door comprising a first canopy and a first air curtain; and
      a second side door, the second side door comprising a second canopy and a second air curtain,
      wherein a first food transport vehicle comprising a first food transport vehicle side door is configured to be positioned adjacent the refrigerated storage unit and aligned with the first side door,
      wherein the first side door is configured to be retracted,
      wherein the first canopy is configured to be deployed when the first side door is retracted,
      wherein the first air curtain is configured to be activated when the first side door is retracted, and
      wherein the perishable items pass through the first side door, the first food transport vehicle side door, and into the first food transport vehicle.

2. The system of claim 1, wherein the first side door is retracted by sliding the first side door upward.

3. The system of claim 1, wherein the first canopy folds into a first frame of the first side door when the first canopy is retracted.

4. The system of claim 1, wherein the first air curtain is located within a first frame of the first side door.

5. The system of claim 1,
   wherein a second food transport vehicle comprising a second food transport vehicle side door is configured to be positioned adjacent the refrigerated storage unit and aligned with the second side door,
   wherein the second side door is configured to be retracted,
   wherein the second canopy is configured to be deployed when the second side door is retracted,
   wherein the second air curtain is configured to be activated when the second side door is retracted, and
   wherein second perishable items pass through the second side door, the second food transport vehicle side door, and into the second food transport vehicle.

6. The system of claim 1, further comprising:
   an onboard computer of the food transport vehicle, the onboard computer configured to transmit completed orders to a management system;
   wherein the management system is configured to:
      identify depleted items that are needed on the food transport vehicle;
      generate a replenishment list of the depleted items; and
      transmit to the food transport vehicle a replenishment command with the replenishment list.

7. The system of claim 6, wherein the onboard computer of the food transport vehicle is further configured to:
   receive the replenishment command identifying the refrigerated storage unit and the first side door.

8. A system for restocking perishable food items, the system comprising:
   a refrigerated storage unit, the refrigerated storage unit comprising:
      a first side door, the first side door comprising a first canopy and a first air curtain; and
      a second side door, the second side door comprising a second canopy and a second air curtain,
      wherein a first food transport vehicle comprising a first food transport vehicle side door is configured to be positioned adjacent the refrigerated storage unit and aligned with the first side door,
      wherein the first side door is configured to be retracted,
      wherein the first canopy is configured to be deployed when the first side door is retracted,
      wherein the first air curtain is configured to be activated when the first side door is retracted, and
      wherein the perishable items pass through the first food transport vehicle side door, through the first side door, and into the refrigerated storage unit.

9. The system of claim 8, further comprising an onboard computing system located onboard the food transport vehicle, wherein the onboard computing system receives a restocking command identifying a location of the refrigerated storage unit, the first side door, and the second side door.

10. The system of claim 8, further comprising:
    an onboard computer of the first food transport vehicle, the onboard computer configured to transmit completed orders to a management system;
    wherein the management system is configured to:
       retrieve an inventory for the first food transport vehicle;
       subtract the completed orders from the inventory to generate a remaining inventory;
       compare the remaining inventory to a next order;
       identify a replenishment center at which the remaining inventory is needed; and
       transmit a restocking command identifying the replenishment center to the first food transport vehicle.

* * * * *